United States Patent
Nicholson et al.

(10) Patent No.: US 7,535,934 B2
(45) Date of Patent: May 19, 2009

(54) OPTICAL CONTINUUM SOURCE INCLUDING LIGHT GENERATION BEYOND WAVELENGTH EDGES OF CONTINUUM

(75) Inventors: Jeffrey W. Nicholson, Morristown, NJ (US); Paul S. Westbrook, Bridgewater, NJ (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 11/728,226

(22) Filed: Mar. 23, 2007

(65) Prior Publication Data

US 2008/0232406 A1    Sep. 25, 2008

(51) Int. Cl.
*H01S 3/30* (2006.01)
(52) U.S. Cl. .................... 372/6; 372/64; 372/50.11
(58) Field of Classification Search ............ 372/6, 372/64
See application file for complete search history.

(56) References Cited

U.S. PATENT DOCUMENTS

| | | | |
|---|---|---|---|
| 6,760,518 B2 | 7/2004 | Girardon et al. | |
| 6,775,447 B2 | 8/2004 | Nicholson et al. | |
| 6,990,270 B2 | 1/2006 | Nicholson | |
| 7,116,874 B2 | 10/2006 | Brown et al. | |
| 2005/0226575 A1* | 10/2005 | Brown et al. | 385/122 |
| 2005/0226576 A1 | 10/2005 | Feder et al. | |
| 2006/0198398 A1 | 9/2006 | Fermann et al. | |
| 2006/0251424 A1 | 11/2006 | Nicholson et al. | |

OTHER PUBLICATIONS

Westbrook, P.S. et al. "Light Generation Beyond a Continuum Edge Using a Fiber Bragg Grating", 2007 Optical Society of America.
Westbrook, P.S. et al. "Bragg Gratings as Phase Matching Elements to Extend Continuum Generation at Short Wavelengths", 2007 Optical Society of America.
Hartl, I. et al. "Integrated Self-Refenced Frequency-Comb Laser Based on a Combination of Fiber and Waveguide Technology", Aug. 22, 2005, vol. 13, No. 17, Optics Express.
Leon-Saval, S.G. et al. "Single-Mode Performance in Multimode Fibre Devices", 2005 Optical Society of America.

* cited by examiner

*Primary Examiner*—Dung T Nguyen
(74) *Attorney, Agent, or Firm*—Wendy W. Koba

(57) ABSTRACT

An optical continuum source is formed that is used to generate both a continuum and one or more light peaks outside the bandwidth of the continuum. In particular, one or more fiber Bragg gratings exhibiting a resonant wavelength less than the short wavelength edge (or greater than the long wavelength edge) of a predetermined continuum are inscribed into a section of highly nonlinear fiber (HNLF) and used to generate the additional light peaks. Gratings may also be formed for areas along the fiber where the continuum spectral power density is essentially "zero". It has been discovered that the use of a Bragg grating generates phase matching with the propagating optical signal, thus resulting in the creation of the additional peaks.

26 Claims, 3 Drawing Sheets

OPTICAL CONTINUUM SOURCE INCLUDING LIGHT GENERATION BEYOND WAVELENGTH EDGES OF CONTINUUM

TECHNICAL FIELD

The present invention relates to a source for generating an optical continuum and, more particularly, to a source including the generation of one or more light peaks outside of the continuum, beyond its short wavelength and long wavelength edges.

BACKGROUND OF THE INVENTION

There are applications in the fiber optics field in which a high power, low noise, broadband light source is of particular interest. For example, efforts are now being made toward spectral slicing wherein a common light source is used to generate a multitude of wavelength division multiplexed (WDM) signals. Such an application thus has the potential for replacing many lasers with a single light source. Other applications include, but are not limited to, frequency metrology, device characterization, dispersion measurements made on specialty fibers, and the determination of transmission characteristics of gratings. All of these various diagnostic tools, as well as many other applications, may be greatly enhanced by the availability of such a broadband source.

In general, continuum generation involves the launching of relatively high laser powers, typically in the form of optical pulses, into an optical fiber, waveguide or other microstructure, wherein the laser pulse train undergoes significant spectral broadening due to nonlinear interactions in the fiber. Previous efforts at continuum generation, typically performed using light pulses having durations on the order of picoseconds ($10^{-12}$ sec) in kilometer lengths of fiber, have unfortunately shown degradation of coherence in the generation process. In particular, additional noise has been found to be introduced into the system during the spectral broadening aspect of the process.

Continuum light of wavelengths spanning more than one octave (variously referred to in the art as "supercontinuum") have been generated in microstructured and tapered optical fibers by launching light pulses having durations on the order of femtoseconds ($10^{-15}$ sec) into the ends of such microstructured or tapered fibers. The extreme spectra thus produced are useful, for example, in measuring and stabilizing pulse-to-pulse carrier envelope phase, as well as in high-precision optical frequency combs. Efforts at modeling the continuum in microstructured fibers based on a modified nonlinear Schrodinger equation (NLSE) have been aimed at understanding the fundamental processes involved in the spectrum generation, and show that coherence is better maintained as the launched pulses are shortened in duration from the order of picoseconds to femtoseconds.

A relatively new type of germanium-doped silica fiber with low dispersion slope and a small effective area, referred to hereinafter as "highly nonlinear fiber", or HNLF, has recently been developed for use as the waveguiding medium in an optical continuum source. Although the nonlinear coefficients of HNLF are still smaller than those obtained with small core microstructured fibers, the coefficients are several times greater than those of standard transmission fibers, due to the small effective area of HNLF. Supercontinuum generation using an HNLF and a femtosecond fiber laser has been previously reported in the literature. U.S. Pat. No. 6,775,447 issued to J. W. Nicholson et al. on Aug. 10, 2004 discloses an HNLF supercontinuum source formed from a number of separate sections of HNLF fiber that have been fused together, each having a different dispersion value at the light source wavelength and an effective area between five and fifteen square microns. In its more general form, "highly nonlinear optical waveguide" can be defined to include various optical media other than fiber, such as optical waveguides formed on a substrate and the like. For the purposes of the present invention, the term "highly nonlinear waveguide" is defined as a waveguide in which the nonlinear length is at least ten times shorter than the dispersion length (see, "Nonlinear Fiber Optics", G. P. Agrawal), where "nonlinear length" is defined as the inverse of the peak power of the input pulse multiplied by the waveguide nonlinear coefficient, and "dispersion length" is defined as the square of the input pulse width divided by the magnitude of the waveguide dispersion parameter $\beta_2$.

In some applications, it is desirable to generate light beyond the wavelength edges of a given continuum (in most cases, such generation within only a narrow wavelength range is required). An "edge" of the continuum, for the purposes of the present invention, can be defined as the wavelength at which the spectrum power drops below a predetermined value (such as 20 dB, or 30 dB). The actual "edge" may be different for different applications. In frequency metrology applications, where the goal is to compare a stabilized continuum frequency comb to another light source that lies outside the spectral bandwidth of the comb, the current approach (harmonic generation) requires that a portion of the frequency comb be "frequency doubled" so that it overlaps with the wavelength to be measured. While this arrangement produces the desired result, it requires the use of additional nonlinear elements.

A method of extending the continuum—even to a narrow range of frequencies—without needing additional nonlinear elements would be considered a significant advance in the art. Inasmuch as the short wavelength edge of a continuum is usually limited by the large material dispersion of the waveguide medium itself, attempts to extend the continuum in this direction by merely increasing the pump power have been found futile. Further, in situations where the continuum includes harmonics far from the continuum, it would be beneficial to be able to "insert" one or more peaks along the spectrum between the harmonics and the continuum.

Thus, a need remains in the art for an arrangement capable of generating light pulses outside of the generated continuum (or in spectral regions where the continuum generation is very weak) without resorting to the inclusion of additional nonlinear components.

SUMMARY OF THE INVENTION

The need remaining in the art is addressed by the present invention, which relates to a source for generating an optical continuum and, more particularly, to a source capable of generating one or more light peaks outside of the continuum, beyond both its short wavelength and long wavelength edges (as well as in regions where the generation is very weak along the length of the nonlinear medium used to generate the continuum).

In accordance with the present invention, one or more fiber Bragg gratings exhibiting a resonant wavelength less outside of the continuum bandwidth are inscribed into a section of highly-nonlinear fiber (HNLF). The inscribed HNLF is then subjected to pulses from a source such as a femtosecond Er fiber laser, resulting in the formation of both the conventional continuum spectrum and light peaks in spectral regions outside of the continuum. Indeed, such gratings may be formed beyond the short wavelength edge of the continuum where the fiber dispersion prevents significant continuum generation. It has been discovered that the use of a Bragg grating generates phase matching with the propagating optical signal, thus resulting in the creation of these additional peaks. While a preferred embodiment utilizes HNLF, it is to be understood that various other types of highly nonlinear optical medium may also be used, with the inventive Bragg grating(s) formed so as to be optically coupled to the waveguide.

Various numbers and types of Bragg gratings may be used in the arrangement of the present invention, where multiple gratings exhibiting different resonant wavelengths may be used to generate multiple peaks on the short/long wavelength sides of the continuum. Additionally, such gratings may be used, in accordance with the present invention, in spectral regions where the power is "weak" along the length of the nonlinear medium used to generate the continuum (spectral power density less than $\frac{1}{1000}^{th}$ of the average spectral power density). A plurality of such gratings may be formed within a single section of the HNLF medium, with one grating "written" within the same fiber section as another or, alternatively, each grating may be written in sequence along an extended portion of the HNLF medium.

Another aspect of the present invention is the ability to utilize "tunable" gratings (for example, thermal tuning or mechanical tuning) to adjust the wavelength(s) to completely phase match the nonlinear source to the grating's peak so as to maximize the power generated near the Bragg resonance. The profile of this tuning may be either uniform or non-uniform along the extent of the grating structure.

Other and further advantages and embodiments of the present invention will become apparent during the course of the following discussion and by reference to the accompanying drawings.

BRIEF DESCRIPTION OF THE DRAWINGS

Referring now to the drawings.

DETAILED DESCRIPTION

It has previously been shown that a fiber Bragg grating can greatly enhance continuum generation in nonlinear fibers, as disclosed in U.S. Pat. No. 7,116,874 issued to Brown et al. on Oct. 3, 2006. In the Brown et al. teaching, one or more Bragg gratings having a Bragg wavelength (resonant wavelength) within the bandwidth of the continuum were used to "enhance" the continuum in the local area of the Bragg wavelength. In the arrangement of Brown et al., the wavelength was selected to lie within the continuum, so that there was a sufficient amount of light energy present to allow for the enhancement to occur.

It has since been discovered that a Bragg grating having a resonant wavelength outside an existing continuum will still allow for a resonant peak to be generated. That is, it has been found that the generation of additional light by the incorporation of Bragg gratings within a section of HNLF used for continuum generation does not rely on the presence of any significant underlying continuum energy to create the out-of-continuum light. Indeed, as explained in detail hereinbelow, it has been found that the presence of the Bragg wavelength results in phase matching with the propagating signal in such a manner as to generate these additional peaks of light energy.

Figure 5:
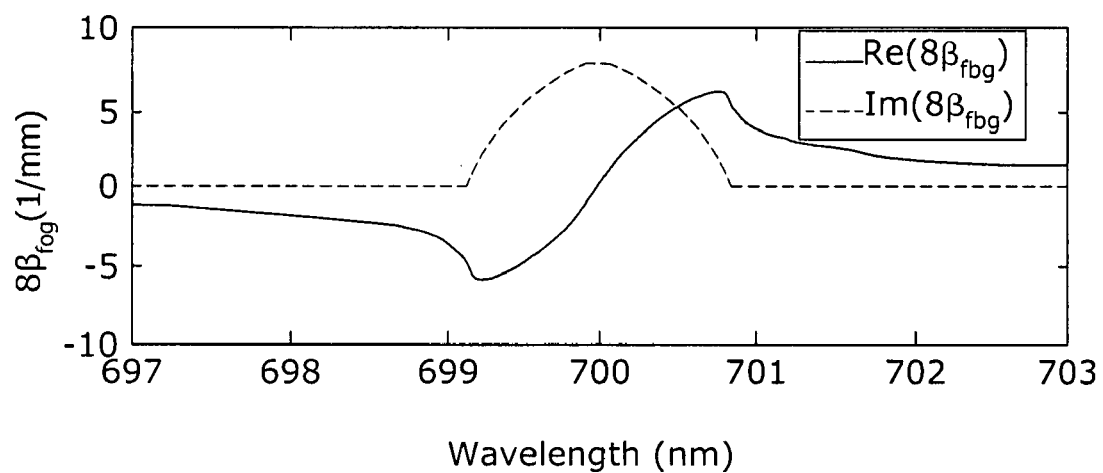
FIG. 5 contains a plot of the real and imaginary parts of the grating propagation constant increment $\delta\beta_{fbg}$.

The grating enhancement peaks as taught in Brown et al. have been understood by first determining (computing) the shape of the continuum without a grating, and then using this field as a source term for the buildup of light that occurs in the presence of grating-related dispersion. In particular, the grating enhancement peak has been shown to result from the interference of the continuum and grating-induced waves and is approximately related to an integral over the solution without a grating:

$$A(\omega, L) \approx A_0(\omega, L) + i\delta\beta_{fbg}(\omega) \int_0^L A_0(\omega, z) e^{-i(D(\omega) + \delta\beta_{fbg}(\omega))(z-L)} dz,$$

where A is defined as the continuum electric field with a Bragg grating, and $A_0$ is defined as the continuum without a grating being present. The term D is defined as the fiber dispersion operator, z is the axial coordinate along the fiber, and L is the length of the inscribed grating. The term $\delta\beta_{fbg}$ is defined as the difference between the propagation constant of the waveguide (fiber) "with" and "without" the Bragg grating being present. The real and imaginary parts of this term can be likened to the phase and amplitude response of the Bragg grating, respectively, except that the phase due to the propagation through the fiber has been removed. FIG. 5 contains a plot of the real and imaginary parts of this grating propagation constant.

In order to understand the underlying discovery of the present invention regarding the use of Bragg gratings outside the continuum bandwidth, the above relation for the continuum electric field is applied at frequencies well outside a conventional continuum bandwidth. Indeed, the above relation can be rewritten in a form that more clearly shows that the Bragg grating acts as a phase matching element. Using integration by parts on the second term of the above equation, the rewritten form is as follows:

$$A(\omega, L) \approx A_0(\omega, 0)e^{i(D(\omega)+\delta\beta_{fbg}(\omega))L} +$$
$$\int_0^L \{dA_0(\omega, z)/dz - iDA_0(\omega, z)\}e^{-i(D(\omega)+\delta\beta_{fbg}(\omega))(z-L)}dz.$$

The term in brackets under the integral is simply the nonlinear polarization from the NLSE, computed without the grating. The above equation has a form similar to that employed in the computation of harmonic generation in the undepleted pump approximation. The first term is simply the linear propagation of the input field through the grating (approximately zero in this case), and the integral term defines the light generated by the Kerr nonlinearity, phase matched by the grating. The grating dispersion enters through the exponential term, which may be viewed as a simplified grating Green's function.

Figure 6:
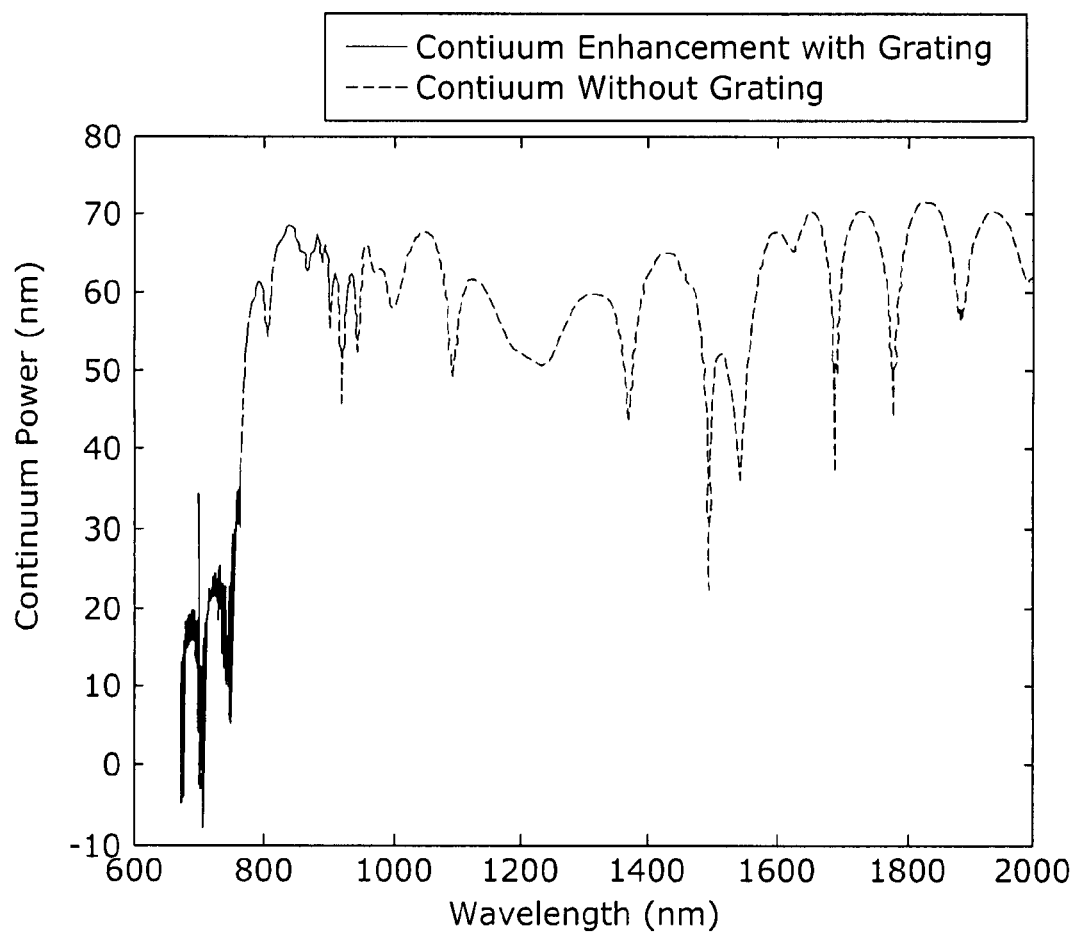
FIG. 6 is a simulation of a continuum computed using phase matching in accordance with the present invention, illustrating the continuum both "with" and "without" the grating enhancement.
Figure 7:
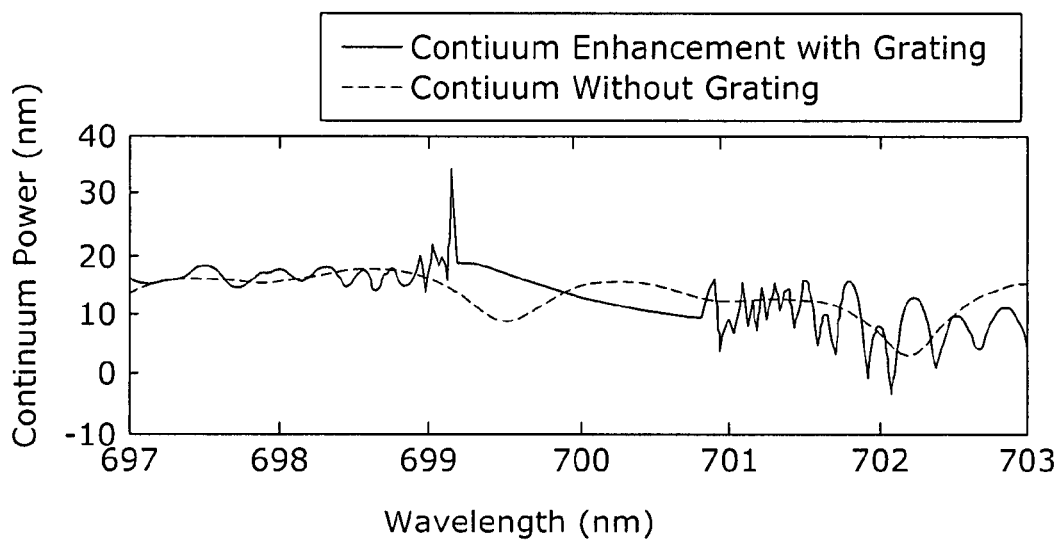
FIG. 7 is an enlargement of the spectral region surrounding the enhancement peak in the continuum of FIG. 6.

The above equation gives a simplified view of a Bragg grating in which the phase of the electric field is given by the exponential term under the integral, assuming that the term $\delta\beta_{fbg}$ is constant along the extent of the grating. In system applications, the period, effective index and index modulation amplitude may be varied along the extent of the grating in an almost arbitrary fashion:

$$n(z)=n_0(Z)+n_1(z)\cos(K_{grating}z+\theta_{grating}(z)),$$

where $n_0$ is defined as the effective index of the core mode, $n_1$ is the index modulation amplitude, $\theta_{grating}$ is the phase of the grating modulation, $K_{grating}=2\pi/\Lambda_{grating}$ is the grating radial spatial period, and $\Lambda_{grating}$ is the grating period. Any of these terms may be varied during the process of inscribing the grating within the fiber or, alternatively, temperature/strain tuning may be utilized to provide real-time, ongoing adjustment of these parameters. This nonuniform grating may be described by a $\delta\beta_{fbg}$ value that varies along the fiber: $\delta\beta_{fbg}=\delta\beta_{fbg}(\omega,z)$. With proper tuning of the grating profile, this variation may be made to completely (substantially) phase match the nonlinear source across the entire length of the fiber. Stated another way, the phase of the integrand in the above equation may be rendered substantially constant as a function of z:

$$\text{phase}=\arg[\{dA_0(\omega,z)/dz - iDA_0(\omega,z)\}e^{-i(D(\omega)+\delta\beta_{fbg}(\omega,z))(z-L)}]=\text{cons},$$

where in this case there is perfect phase matching of the nonlinear source term, and the peak near the Bragg resonance is maximized. FIG. 6 is a simulation of a continuum computed using the above phase matching formula, illustrating the continuum both "with" and "without" the grating enhancement. FIG. 7 is an enlargement of the spectral region surrounding the peak in the continuum of FIG. 6, illustrating that the computed enhancement is on the order of 10 dB or more.

Thus, in accordance with the present invention, the ability to "tune" the gratings allows for phase matching in various situations. In practice, the tuning is best achieved by adding adjustable heaters along the length of the fiber Bragg grating, where the temperature of the fiber may be adjusted differently in localized areas to obtain phase matching at each point along the grating. The tuning may either be of a uniform profile across the extent of the grating, or exhibit a particular non-uniform profile that is desired for a specific situation, that is, to obtain a certain arrangement of peaks required for a specific purpose.

Figure 1:
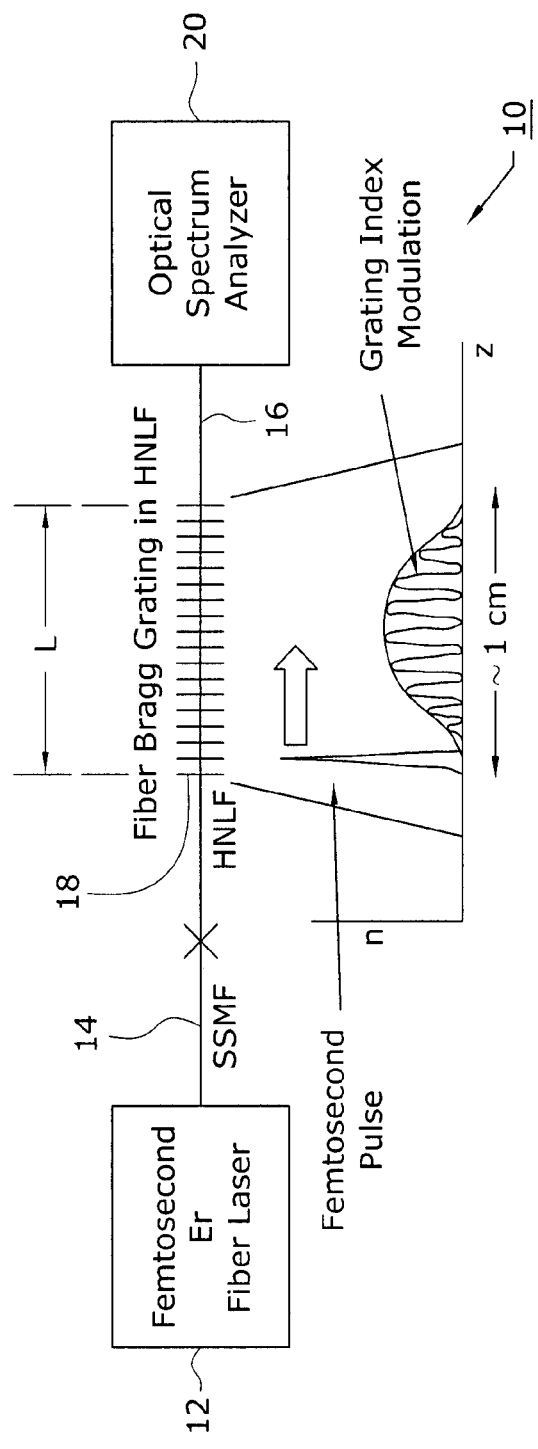
FIG. 1 illustrates an exemplary continuum source of the present invention, useful in generating light energy outside the bandwidth of the continuum by including a fiber Bragg grating with a resonant wavelength less than the short wavelength edge of a generated continuum.

FIG. 1 illustrates an exemplary arrangement 10 for light generation beyond the continuum spectrum using a fiber Bragg grating in accordance with the present invention. Arrangement 10 comprises a pump light source 12, in this case an amplified, modelocked erbium-doped fiber laser. In an experimental arrangement, light source 12 had a repetition rate of 46 MHz, a pulse duration of 35 femtoseconds, a center wavelength of 1580 nm and an average power of approximately 0.1 W, as measured at the termination of a section of single mode fiber 14 coupled to the output of light source 12. Single mode fiber 14 is shown as spliced to a section of highly-nonlinear fiber (HNLF) 16. In accordance with the present invention, a Bragg grating 18 is inscribed along a length L of HNLF 16. In the experimental arrangement, the grating was written in the core of HNLF 16 using a single flood exposure with a 248 nm Gaussian-shaped excimer beam through a phase mask. The formed Bragg grating 18 was defined as exhibiting a period ($\Lambda$) of 236 nm, and a Bragg wavelength ($\lambda$) of 702 nm, and having a length of approximately 3 cm. An optical spectrum analyzer 20 is shown as coupled to the far-end termination of HNLF 16, and is used to measure the output of the HNLF/Bragg grating arrangement of the present invention. While the arrangement of FIG. 1 illustrates the utilization of a section of HNLF to generate the continuum, it is to be understood that the principles of the present invention are equally applicable for use with various other types of highly nonlinear optical waveguides.

Figure 3:
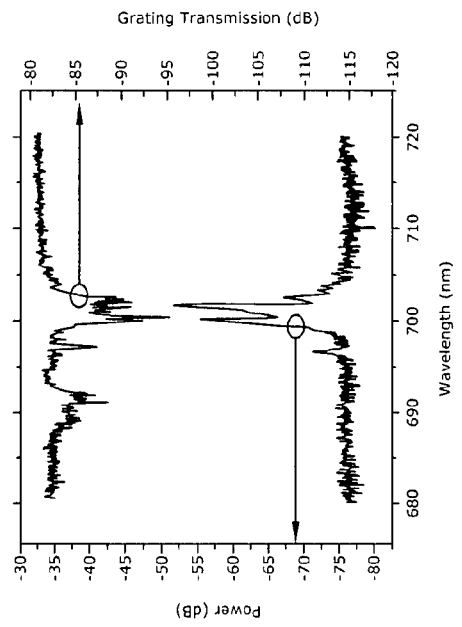
FIG. 3 is a plot showing both the light generation within the vicinity of the 700 nm peak and the transmission spectrum associated with this wavelength region.
Figure 2:
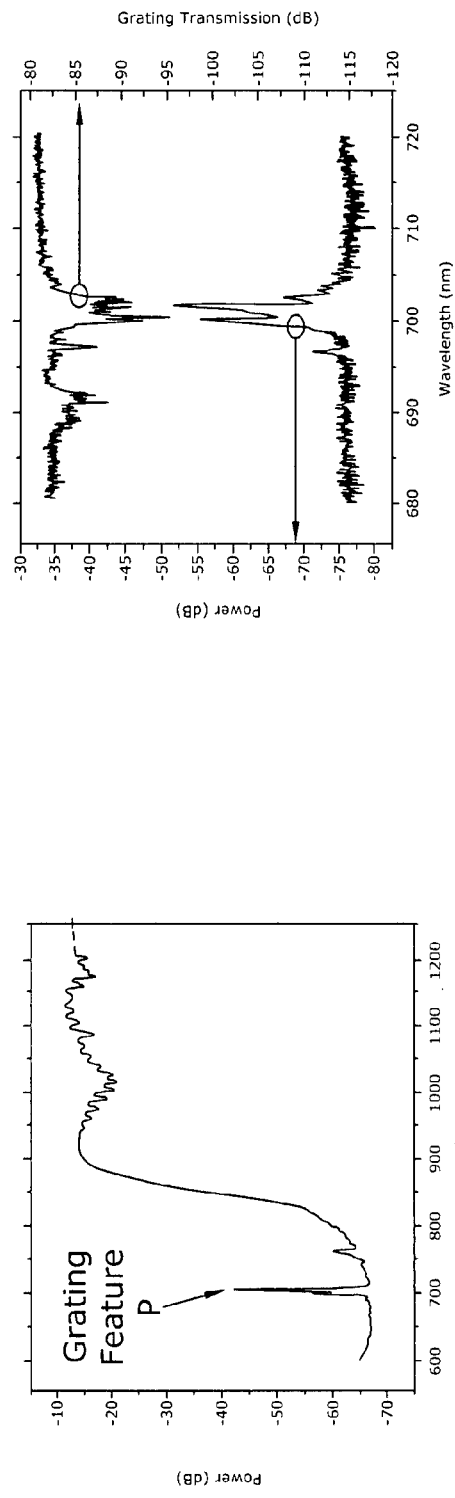
FIG. 2 is a plot of the lower wavelength portion of the continuum generated with the arrangement of FIG. 1 (i.e., 1200 nm and below), illustrating the generation of a peak at 700 nm, below the short wavelength edge of the continuum (approximately 800 nm)

FIG. 2 contains a plot of a portion of the spectrum generated with the arrangement of FIG. 1, as measured by OSA 20. In this case, only the lower wavelength portion of the generated continuum is shown, the continuum as generated extends well beyond the 1200 nm value in the plot. Of interest to the subject matter of the present invention is the generation of a grating peak, denoted P in the plot of FIG. 2, near the center wavelength of Bragg grating 18. It has been estimated that grating peak P has a total power on the order of 0.3 µW, which is close to the power levels obtained in prior art frequency doubling arrangements. FIG. 3 shows the light generation near peak P, as well as its transmission spectrum as measured with a white light lamp source. The light is found to be generated inside and near the edges of the Bragg resonance. The remaining resonance dips in this plot can be attributed to coupling to higher order guided modes and cladding modes within the HNLF.

Figure 4:
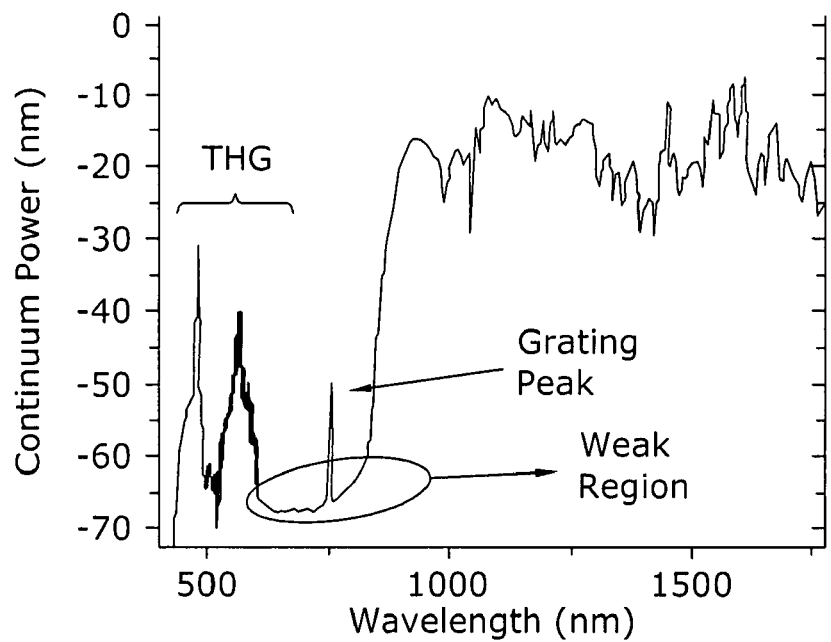
FIG. 4 is a plot of an alternative generated continuum, in this case including a region of third harmonic generation, with the additional peaks of the present invention formed in the "weak" spectral region between the main continuum and the harmonics.

As mentioned above, another significant aspect of the present invention is the generation of light in an area where the existing continuum is substantially weak everywhere along the length of the waveguide (for the purposes of the invention, "substantially weak" is defined as a power spectral density less than $\frac{1}{1000}^{th}$ of the average continuum spectral density). There are source arrangements where the generated energy includes a set of harmonics located in a spectral region removed from the continuum. FIG. 4 is a graph of continuum power over the wavelength range of 500-1500 nm, illustrating a continuum region extending upward from a value of approximately 900 nm. An area of third harmonic generation, labeled THG, is shown as be formed in a narrow band area ±500 nm. Utilizing the definition of "substantially weak" continuum as given above, the region between this third harmonic generation and the short wavelength edge of the continuum can be defined as "weak" and an area in which the use of a fiber Bragg grating in accordance with the present invention can result in the addition of one (or more) energy peaks.

In this example, a grating peak centered at about 750 nm is shown. Indeed, this peak is the result of including a fiber Bragg grating in accordance with the present invention, where the center wavelength of the grating is not within the conventional continuum bandwidth.

Thus, a fiber Bragg grating in accordance with the present invention can be used to generate light beyond the wavelength edges of a continuum formed used HNLF, or at regions defined as "substantially weak" within the continuum. With respect to the short wavelength edge, this region had previously been inaccessible as a result of the large dispersion of these fibers at short wavelengths. Using the dispersion of a fiber Bragg grating in accordance with the present invention, it is now possible to overcome this limitation and generate light at wavelengths far in excess of that determined by fiber dispersion.

While the foregoing description represents a preferred embodiment of the present invention, it will be obvious to those skilled in the art that various modifications may be made without departing from the spirit and scope of the invention as pointed out by the following claims.

What is claimed is:

1. An optical source suitable for generating both a continuum spectrum and additional light peaks at the output thereof, the optical source comprising
   a laser pulse source capable of generating output light pulses suitable for creating continuum radiation;
   a section of highly nonlinear optical waveguiding medium coupled to receive the output light pulses from the laser pulse source, wherein the propagation of pulses through the highly nonlinear optical waveguiding medium generates an optical continuum spectrum exhibiting optical energy from a lower, short wavelength edge to a higher, long wavelength edge; and
   at least one Bragg grating inscribed along the section of highly nonlinear optical waveguiding medium, the at least one Bragg grating exhibiting a resonant wavelength outside of the generated optical continuum for creating at least one light peak beyond the generated optical continuum, the resonant wavelength at a region where the power spectral density of the continuum, in the absence of any Bragg gratings and measured at any point along the waveguide, is less than $1/1000^{th}$ of the average power spectral density of the optical continuum.

2. An optical source as defined in claim 1 wherein the at least one Bragg grating is tunable to adjust the location of the resonant wavelength.

3. An optical source as defined in claim 2 wherein the tuning is applied uniformly along the extent of the at least one Bragg grating.

4. An optical source as defined in claim 2 wherein the tuning is applied non-uniformly along the extent of the at least one Bragg grating.

5. An optical source as defined in claim 2 wherein the at least one tunable Bragg grating comprises a grating tunable during use of said optical source.

6. An optical source as defined in claim 5 wherein thermal tuning of the Bragg resonant wavelength is used.

7. An optical source as defined in claim 5 wherein mechanical straining is used to tune the Bragg resonant wavelength.

8. An optical source as defined in claim 5 wherein the tuning exhibits a uniform profile along the extent of the at least one Bragg grating.

9. An optical source as defined in claim 5 wherein the tuning exhibits a non-uniform profile along the extent of the at least one Bragg grating.

10. An optical source as defined in claim 2 wherein the index profile of the at least one Bragg grating is varied during inscription to maximize the spectral peak near the Bragg resonance.

11. An optical source as defined in claim 1 wherein the at least one Bragg grating comprises a plurality of separate Bragg gratings, each exhibiting a different resonant wavelength such that the plurality of separate Bragg gratings generates a plurality of light peaks beyond the wavelength edges of the generated optical continuum.

12. An optical source as defined in claim 1 wherein the section of highly nonlinear optical waveguiding medium comprises a section of highly nonlinear optical fiber.

13. An optical source as defined in claim 1 wherein the source further comprises a section of single mode fiber coupled between the output of the laser pulse source and the section of highly nonlinear optical waveguiding medium.

14. An optical source as defined in claim 13 wherein the highly nonlinear optical waveguiding medium comprises a section of highly nonlinear optical fiber, the single mode fiber fused to the section of highly nonlinear optical fiber.

15. An optical source as defined in claim 1 where the resonant wavelength is varied along the length of the Bragg grating so as to maximize the light peak near the grating.

16. A method of generating both an optical continuum output and at least one light peak outside the wavelength edges of the generated continuum, the method comprising the steps of:
   a) providing at least one section of highly nonlinear optical waveguide;
   b) inscribing at least one Bragg grating structure along a portion of the highly nonlinear optical waveguide, the at least one Bragg grating having a resonant wavelength beyond the wavelength edges of the generated continuum at a region where the power spectral density of the continuum, in the absence of any Bragg gratings and measured at any point along the waveguide, is less than $1/1000^{th}$ of the average power spectral density of the optical continuum; and
   c) illuminating the arrangement as formed in step b) with laser pulses, the duration of the laser pulses capable of generating an optical output continuum along a wavelength region bounded by a short wavelength lower edge and a long wavelength upper edge, and also generating at least one light peak beyond the wavelength edges of the continuum.

17. The method as defined in claim 16, wherein the method further comprises the step of:
   d) adjusting the resonant wavelength of the at least one Bragg grating along the length thereof in order to maximize the light peak near the grating.

18. The method as defined in claim 17 wherein in performing step d), the method includes modifying the temperature profile of the at least one Bragg grating to adjust the resonant wavelength.

19. The method as defined in claim 18 wherein a uniform temperature profile is utilized.

20. The method as defined in claim 18 wherein a non-uniform temperature profile is utilized.

21. The method as defined in claim 17 wherein in performing step d), the method includes imparting mechanical strain to create a strain profile along the at least one Bragg grating to adjust the resonant wavelength.

22. The method as defined in claim 21 wherein a uniform strain profile is utilized.

23. The method as defined in claim 21 wherein a non-uniform strain profile is utilized.

24. The method as defined in claim 16 wherein in performing step b), the characteristics of the at least one Bragg grating are modified along the length of the grating as it is being inscribed.

25. The method as defined in claim 16 wherein in performing step b) a plurality of separate Bragg gratings are inscribed along the section of highly nonlinear optical waveguide, each Bragg grating having a different resonant wavelength.

26. The method as defined in claim 16 wherein in performing step c), an excimer laser source is used.

* * * * *